(12) United States Patent
Aparin et al.

(10) Patent No.: US 8,892,485 B2
(45) Date of Patent: Nov. 18, 2014

(54) METHODS AND SYSTEMS FOR NEURAL PROCESSOR TRAINING BY ENCOURAGEMENT OF CORRECT OUTPUT

(75) Inventors: Vladimir Aparin, San Diego, CA (US); Jeffrey A. Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 12/832,399

(22) Filed: Jul. 8, 2010

(65) Prior Publication Data

US 2012/0011089 A1 Jan. 12, 2012

(51) Int. Cl.
*G06F 15/18* (2006.01)
*G06N 3/08* (2006.01)
*G06N 3/063* (2006.01)
*G06N 3/04* (2006.01)

(52) U.S. Cl.
CPC ............. *G06N 3/063* (2013.01); *G06N 3/049* (2013.01)
USPC .............................................. 706/25; 706/31

(58) Field of Classification Search
CPC ...... G06N 3/063; G06N 3/0635; G06N 3/049; G06N 3/04; G06N 3/08; G06N 3/02; G05B 2219/39271; G06F 15/18; G06F 19/00; G06F 19/12; G06F 19/18; G06F 19/24; G06F 19/3437; G06T 3/00; G06T 9/002
See application file for complete search history.

(56) References Cited

U.S. PATENT DOCUMENTS 5,822,742 A * 10/1998 Alkon et al. .................... 706/31
2008/0162391 A1 7/2008 Izhikevich
2010/0076916 A1 3/2010 Van Der Made

OTHER PUBLICATIONS

"To spike or not to spike: A probabilistic spiking neuron model", Nikola Kasabov, Neural Networks, vol. 23, Issue 1, Jan. 2010, pp. 16-19, Article history Received Jun. 10, 2009 Accepted Aug. 31, 2009.*
"Programmable synaptic weights for an aVLSI network of spiking neurons", Circuits and Systems, 2006. ISCAS 2006. Proceedings. 2006 IEEE International Symposium on Date of Conference: May 21-24, 2006 Author(s): Yingxue Wang.*
E. M. Izhikevich, "Solving the Distal Reward Problem Through Linkage of STDP and Dopamine Signaling", in Cerebral Cortex, pp. 2443-2452, Oct. 2007.
Arthur V. et al., "Learning in Silicon: Timing is Everything", Advances in Neural Information Processing Systems 18, May 1, 2006, XP55010017, ISBN: 978-0-26-223253-1 Retrieved from the Internet: URL:http://www.Stanford.edu/group/brainsinsilicon/pdf/05_conf_NIPS_SiLearning.pdf [retrieved on Oct. 19, 2011].
Florian, "Reinforcement learning through modulation of spike-timing-dependent synaptic plasticity", Internet Citation, Sep. 27, 2006, pp. 1-28, XP007914409, Retrieved from the Internet: URL:http://web.archive.org/web/20060927141830/http://www.coneural.org/florian/papers/06_modulated_STDP.pdf [retrieved on Aug. 12, 2010].
International Search Report and Written Opinion—PCT/US2011/043456—ISA/EPO—Nov. 3, 2011.

(Continued)

*Primary Examiner* — Kakali Chaki
*Assistant Examiner* — Luis Sitiriche
(74) *Attorney, Agent, or Firm* — Rupit M. Patel (57) ABSTRACT

Certain embodiments of the present disclosure support implementation of a neural processor with synaptic weights, wherein training of the synapse weights is based on encouraging a specific output neuron to generate a spike. The implemented neural processor can be applied for classification of images and other patterns.

40 Claims, 6 Drawing Sheets

(56) References Cited

OTHER PUBLICATIONS

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the Internet: URL:http://www.kip.uni-heidelberg.de/Veroeffentiichungen/download.cgi/4620/ps/1774.pdf [retrieved on Nov. 23, 2009].

* cited by examiner

METHODS AND SYSTEMS FOR NEURAL PROCESSOR TRAINING BY ENCOURAGEMENT OF CORRECT OUTPUT

FIELD

Certain embodiments of the present disclosure generally relate to neural system engineering and, more particularly, to a method for hardware implementation of a neural processor with training of synaptic weights based on encouraging a specific output neuron to fire.

BACKGROUND

In a typical image-recognition task, an image can be presented to a network of spiking neurons. Certain number of neurons from the network may be designated as classification outputs, where each output neuron may correspond to a class of images. During a training process, a set of known images are presented to the network, and synaptic weights of the neurons may be adjusted to cause a particular output neuron in the network to fire.

The method proposed in the present disclosure provides efficient and robust training of the network of neurons for correct classification of images and other patterns.

SUMMARY

Certain embodiments of the present disclosure provide an electrical circuit. The electrical circuit generally includes a neural processing unit of a neural processor with one or more synapses and with a neuron circuit connected to the synapses, wherein the neural processing unit provides, during training of the neural processor, an encouragement for firing of a specific output neuron circuit of the neural processor indicating that a signal of a particular class is input to the neural processor.

Certain embodiments of the present disclosure provide a method for implementing a neural processing unit of a neural processor. The method generally includes connecting a neuron circuit of the neural processing unit with one or more synapses of the neural processing unit, and providing, during training of the neural processor, an encouragement for firing of a specific output neuron circuit of the neural processor indicating that a signal of a particular class is input to the neural processor.

Certain embodiments of the present disclosure provide an apparatus for implementing a neural processing unit of a neural processor. The apparatus generally includes means for connecting a neuron circuit of the neural processing unit with one or more synapses of the neural processing unit, and means for providing, during training of the neural processor, an encouragement for firing of a specific output neuron circuit of the neural processor indicating that a signal of a particular class is input to the neural processor.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Neural System

Figure 1:
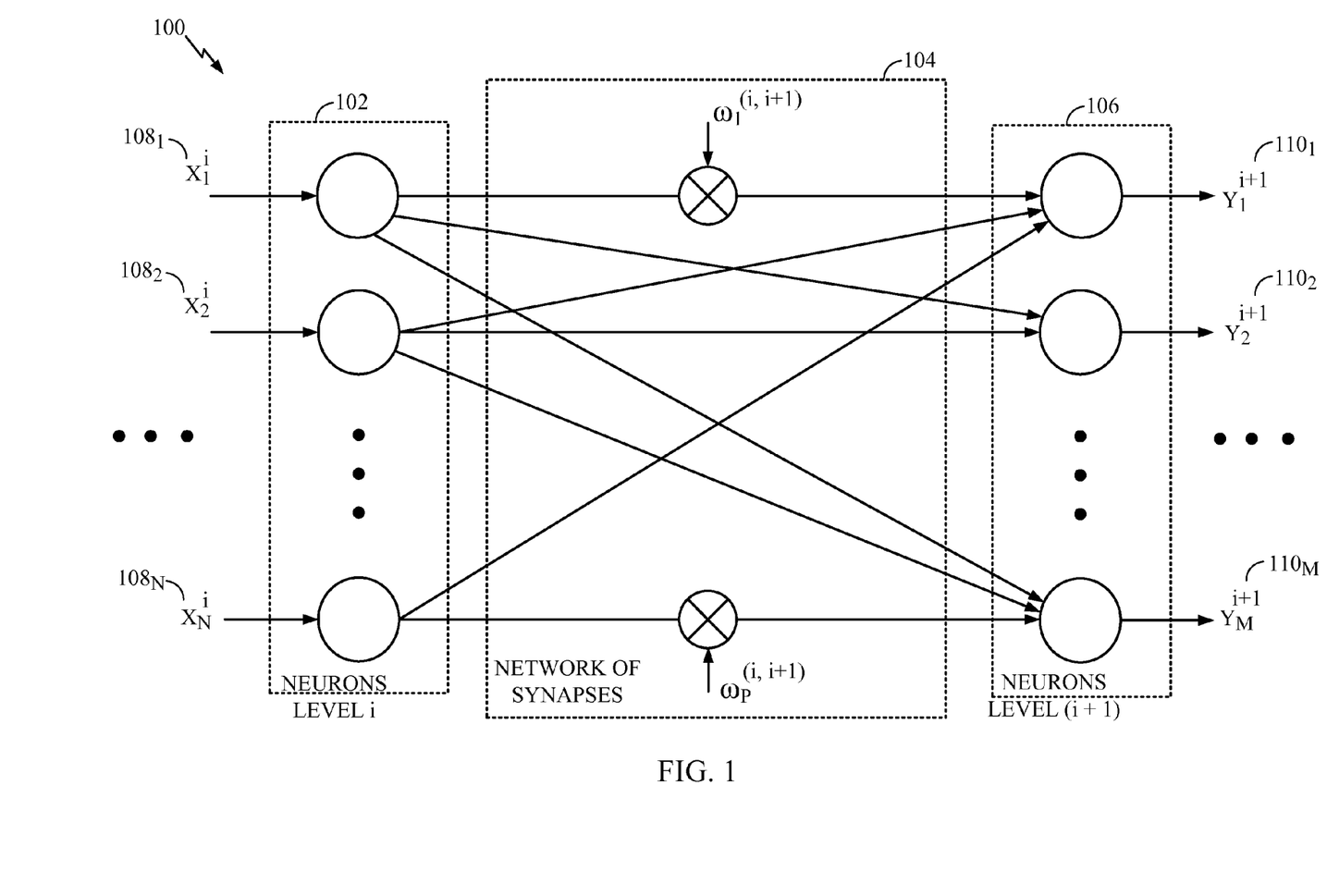
FIG. 1 illustrates an example neural system in accordance with certain embodiments of the present disclosure.

FIG. 1 illustrates an example neural system 100 with multiple levels of neurons in accordance with certain embodiments of the present disclosure. The neural system 100 may comprise a level of neurons 102 connected to another level of neurons 106 though a network of synaptic connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, and motor control. Each neuron in the neural system 100 may be implemented as a neuron circuit. The neuron membrane charged to the threshold value initiating the output spike may be implemented as a capacitor that integrates an electrical current flowing through it.

It should be noted that the capacitor may be eliminated as the electrical current integrating device of the neuron circuit, and a much smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Exemplary Image Recognition System with Network of Neurons

Figure 2:
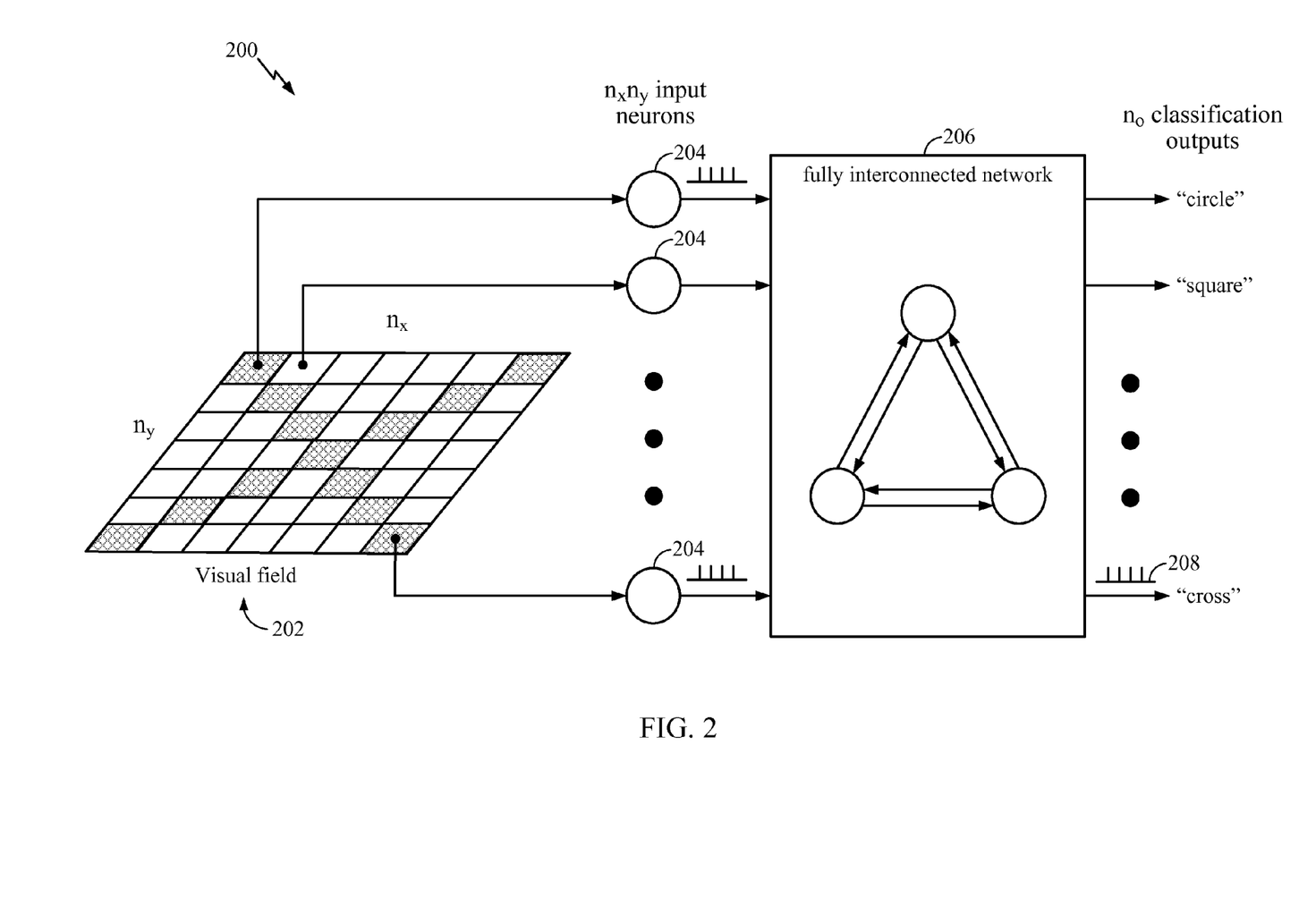
FIG. 2 illustrates an example of image-recognition system based on a network of neurons in accordance with certain embodiments of the present disclosure.

FIG. 2 illustrates an example image-recognition system 200 in accordance with certain embodiments of the present disclosure. An image 202 to be recognized may be presented to a network 206 of spiking neurons via a plurality of input spiking neurons 204. As illustrated in FIG. 2, each of the neurons 204 may correspond to one pixel of the image 202, and the input neuron 204 may spike in accordance to illumination of its associated pixel. The neuron network 206 may correspond to the neural system 100 from FIG. 1 where all neurons may be fully interconnected, i.e. each neuron of the network 206 may be connected through synapses with all other neurons in the network.

Certain number of neurons from the network 206 may be designated as classification outputs. Each output neuron may correspond to one class of input images. During training, a set of known images 202 may be presented to the network 206, and weights of synaptic connections within the network 206 may be appropriately adjusted to cause the correct classification output neuron to fire. As illustrated in FIG. 2, the "cross" output neuron may be trained to fire one or more spikes 208 when the "cross image" 202 is presented to the input neurons 204 of the network 206.

Figure 3:
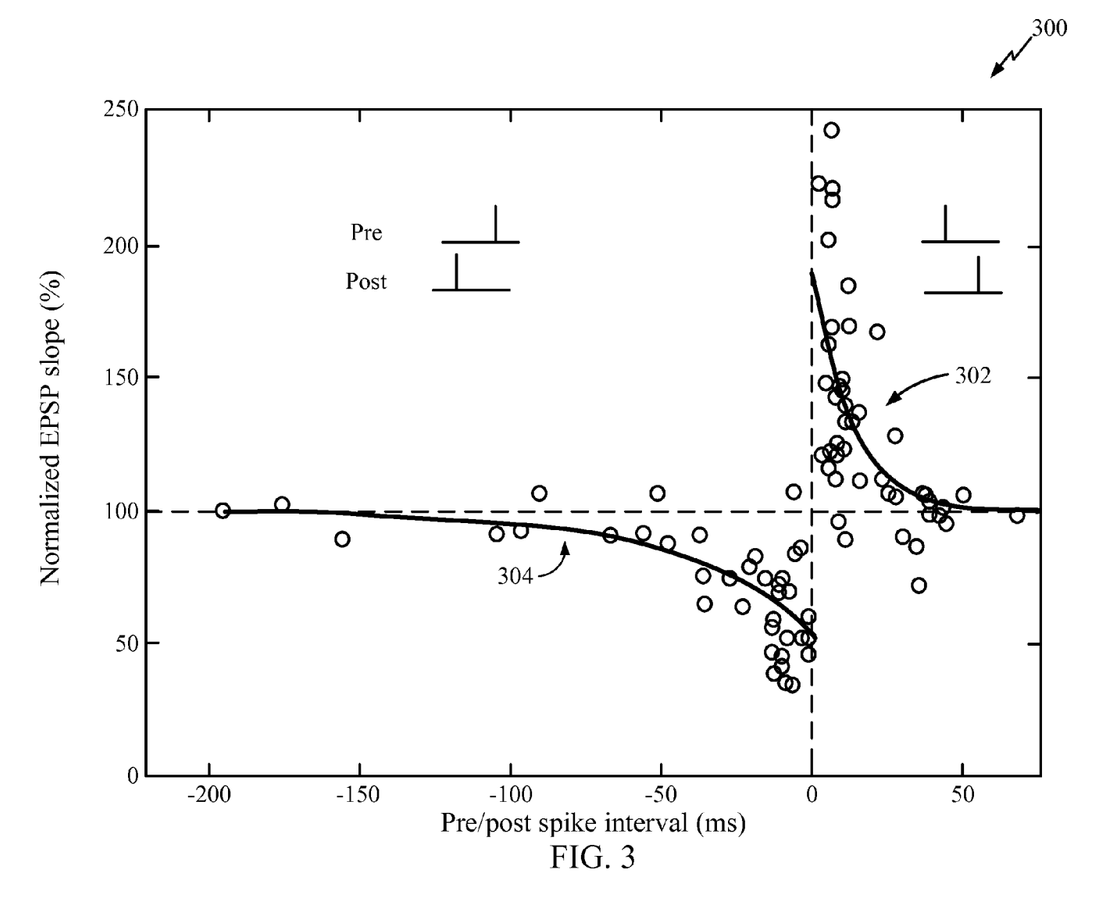
FIG. 3 illustrates an example graph diagram of a synaptic weight change as a function of relative timing of pre-synaptic and post-synaptic spikes in accordance with certain embodiments of the present disclosure.

The adjustment of synapse weights during the training process may be based on the Spike-Timing-Dependent Plasticity (STDP). FIG. 3 illustrates an example graph diagram 300 of a synaptic weight change (i.e., of a normalized excitatory post-synaptic potential (EPSP)) as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred as a Long-Term Potentiation (LTP) of the synapse. The reverse order of firing may reduce the synaptic weight, as illustrated in a portion 304 of the graph 300, causing a Long-Term Depression (LTD) of the synapse.

It can be observed from the graph portion 302 that the amount of LTP may decrease roughly exponentially as a function of difference between pre-synaptic and post-synaptic spike times with a time constant of the same order as a typical neuron membrane time constant. This may assure that only those pre-synaptic spikes arriving within the temporal range over which a neuron integrates its inputs may be potentiated, further enforcing the requirement of causality.

As illustrated in FIG. 3, the synaptic weight-training curve may be asymmetrical. The LTP weight increment represented by the graph portion 302 may be larger for short inter-spike intervals, but it may decay faster (e.g., decaying within 40 ms) than the LTD weight increment (e.g., decaying within 150 ms, as illustrated in FIG. 3 by the graph portion 304). The dominance of LTD outside the causality window may cause weakening of synapses when pre-synaptic spikes occur randomly in time with respect to post-synaptic action potentials. Therefore, these random events may not consistently contribute evoking the synapses.

It can be observed from FIG. 3 that the basic STDP approach may only depend on duration of inter-spike intervals. Therefore, during weight training according to the basic STDP, no information may be available whether a certain weight change leads to a correct answer related to, for example, a class of image.

Exemplary Architecture of Neural Processing Unit with Reward-Modulated STDP

Figure 4:
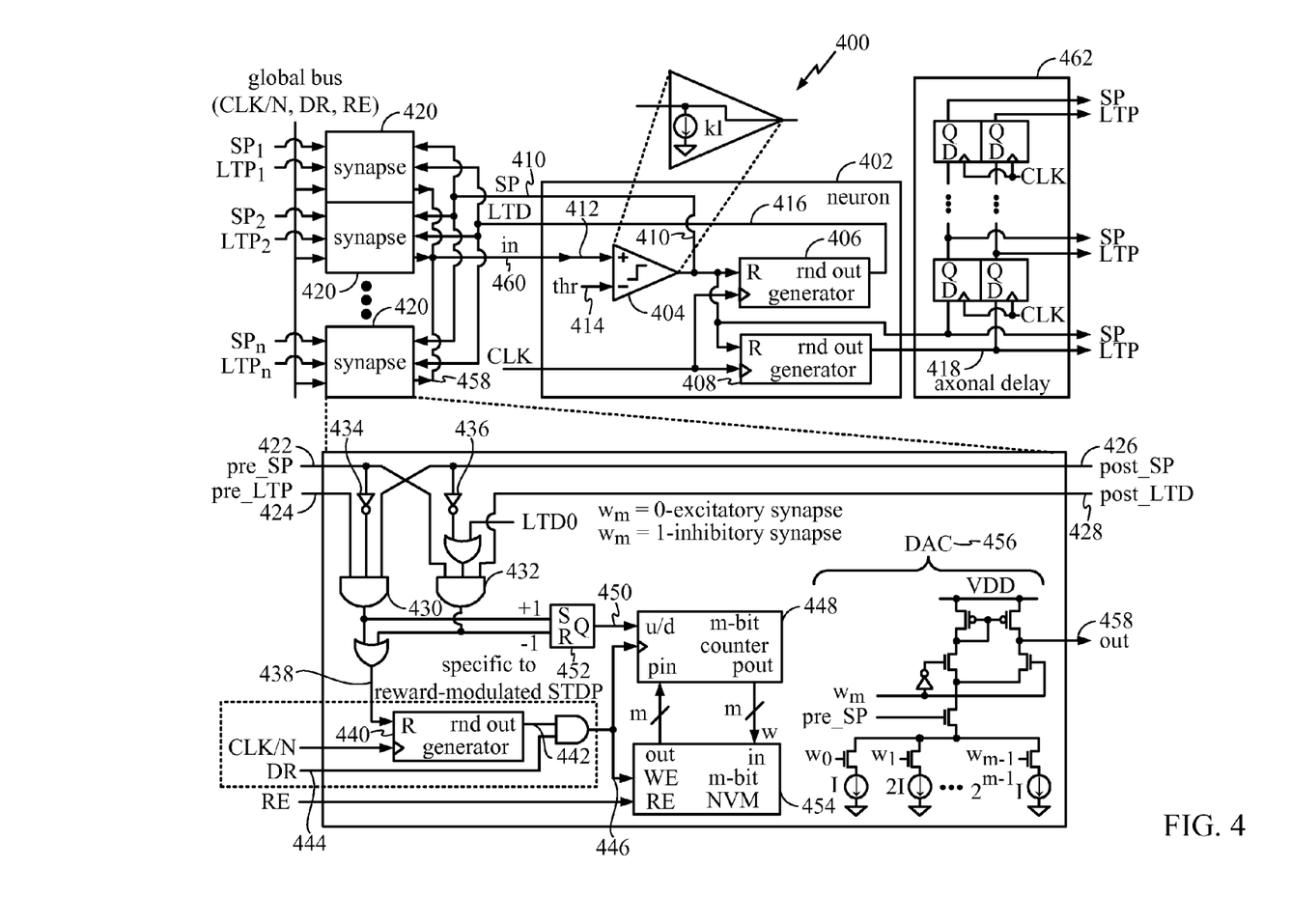
FIG. 4 illustrates an example block diagram of a neural processing unit with reward-modulated synapse weight training in accordance with certain embodiments of the present disclosure.

The aforementioned basic STDP approach for synapse weight training may be combined with a distal reward into a reward-modulated STDP. FIG. 4 illustrates an example architecture of a neural processing unit 400 with the reward-modulated synapse weight training. The neural processing unit 400 may comprise one neuron circuit 402, and it may be employed for implementing the network of neurons 206 from FIG. 2.

The neuron circuit 402 may comprise a spike generator (e.g., a comparator or a firing circuit) 404 and two random binary generator circuits 406 and 408 for LTP and LTD, respectively. The generator circuits 406-408 may be reset (triggered) by a spike signal 410 generated when an input current 412 of the neuron 402 is above a threshold level 414 of the firing circuit 404.

The generators 406-408 may produce binary codes (i.e., pulse signals) 416-418 with a probability of logic "1" (i.e., pulse) to occur in a defined time interval exponentially decaying over time from a reset moment. The probabilistic pulse signals 416 and 418 may represent LTD and LTP training signals, respectively. The decay time constant of the probability may be specific to LTP and LTD parts of the STDP characteristic (for example, typical values may be $\tau_+ =16.8$ ms and $\tau_- =33.7$ ms for the LTP and LTD, respectively). It should be noted that the probabilistic LTP signal 418 may cause another weight value of another synapse connected to the neural processing unit 400 to increase by a defined value.

Each synapse 420 may receive a pre-synaptic spike 422 and a pre-synaptic LTP signal 424, as well as a post-synaptic spike 426 and a post-synaptic LTD signal 428. It can be observed from FIG. 4 that the post-synaptic spike 426 may correspond to the spike signal 410, and the post-synaptic LTD signal 428 may correspond to the probabilistic binary code signal 416. A logic consisting of two AND gates 430-432 and two inverters 434-436 may detect a training event. The LTP training event may be detected when the pre-synaptic LTP signal 424 is equal to logic "1," the post-synaptic spike signal 426 is equal to logic "1," and the pre-synaptic spike signal 422 is equal to logic "0." On the other hand, the LTD training event may be detected when the post-synaptic LTD signal 428 is equal to logic "1," the pre-synaptic spike signal 422 is equal to logic "1," and the post-synaptic spike signal 426 is equal to logic "0." According to this logic, no training may take place when both pre- and post-synaptic neurons spike simultaneously (i.e., when both the pre-synaptic spike signal 422 and the post-synaptic spike signal 426 are equal to logic "1").

As illustrated in FIG. 4, due to the reward-modulated STDP, the weight training may not take place right away when the above conditions for either LTP or LTD are satisfied. Instead, an output 438 of the training-event detector may reset a random generator circuit 440 of the synapse 420, which may then start generating a binary code 442 with a probability of logic "1" exponentially decaying over time from the reset moment. The decay time constant of the probability may be specific to an eligibility trace of the reward-modulated STDP. The output 442 of the random binary generator 440 may be gated by a distal reward (DR) gate signal 444 emulating an extracellular dopamine release in response to a pair of spikes associated with pre-synaptic and post-synaptic neurons. In particular, the DR gate signal 444 may be generated as a delayed reward of consecutive spikes of the pre-synaptic signal 422 and the post-synaptic signal 426.

A gated output signal 446 of the random binary generator 440 may be applied as a clock signal to an up-down counter 448 that stores a current weight value of the synapse 420. A state of the counter 448 may be incremented if the detected training event corresponds to the LTP (i.e., an output 450 of an SR latch 452 is equal to logic "1"). On the other hand, the counter state may be decremented if the detected training event corresponds to the LTD (i.e., the output 450 of the SR latch 452 is equal to logic "0").

The gated output 446 of the random generator 440 may be also utilized to trigger transferring of the counter state into a non-volatile memory (NVM) 454. The synaptic weight stored in the up-down counter 448 may be also used as an input to a binary-weighted digital-to-analog conversion (DAC) circuit 456. An output current 458 of the DAC 456 may be gated by the pre-synaptic spike signal 422 before being summed with output currents of other synapses connected to an input 460 of the neuron circuit 402. The neuron circuit 402 may be also connected to other neurons (i.e., post-synaptic neurons relative to the neuron 402) via an axonal delay circuit 462.

It should be noted that the above implemented reward-modulated STDP may promote future synaptic changes which did not lead to a dopamine release. Therefore, the reward-modulated STDP may not comprise the correct feedback to inform the system that the previous synaptic changes yielded the correct result. Simulations show that if the reward-modulated STDP is applied for training of synapses in the network of neurons 206 from FIG. 2, then the incorrect image classification may occur. This approach may also complicate the synaptic hardware by requiring an eligibility trace generator per synapse, as illustrated in FIG. 4 by the random binary generator 440 within each synapse 420.

Exemplary Architecture of Neural Processing Unit with Training of Synaptic Weights Based on Encouragement of Correct Output Certain embodiments of the present disclosure provide implementation of a neural processing unit within a neural processor where synapse weight training may be based on STDP with encouraging of a correct processor output, while the aforementioned reward modulation may not be utilized. The encouragement of correct output during the synapse training process when a test signal (e.g., a known image of a particular class) is input to the neural processor may be implemented through appropriately conditioning of output neurons or their inputs. This may be achieved in several ways. In one embodiment, potentiation probabilities of input synapses of the correct output neuron may be increased. In another embodiment, depression probabilities of the input synapses of the correct output neuron may be decreased. In yet another embodiment, a probability of firing of the correct output neuron may be increased. It should be noted that the encouragement of the correct classification output may be turned off during normal operations of the neural processor (i.e., during operations that utilize previously trained synaptic weights of the neural processor).

Figure 5:
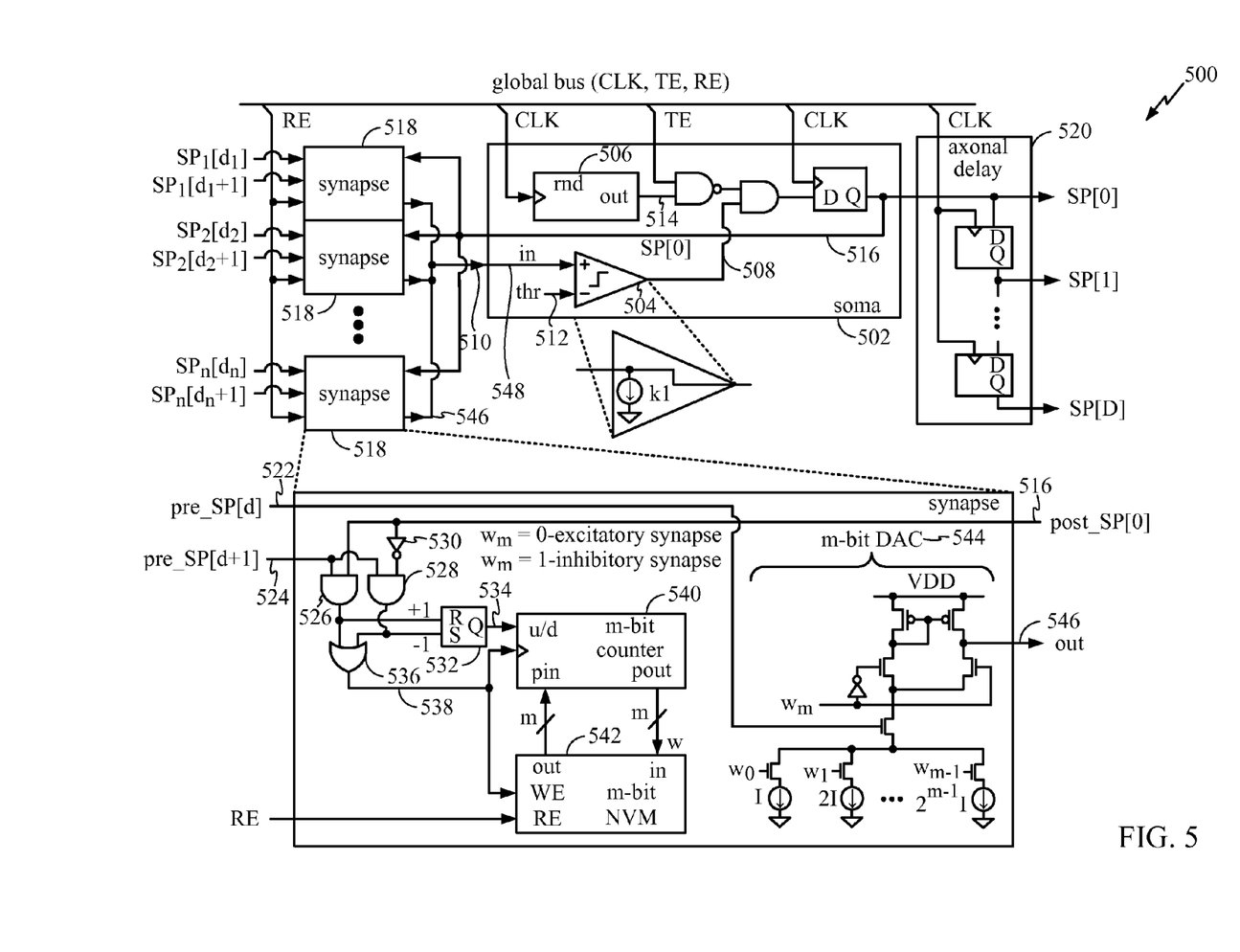
FIG. 5 illustrates an example block diagram of a neural processing unit with synapse weight training based on an encouragement of correct output in accordance with certain embodiments of the present disclosure.

FIG. 5 illustrates an example block diagram 500 of a neural processing unit with synapse weight training based on an encouragement of correct output in accordance with certain embodiments of the present disclosure. The neural processing unit 500 may comprise a single neuron circuit (i.e., a neuron soma 502), and it may be employed for implementing the network of neurons 206 from FIG. 2.

The neuron soma 502 may comprise a spike generator (e.g., a comparator or a firing circuit) 504 and a random binary generator circuit 506. A spike signal 508 may be generated when an input current 510 of the neuron soma 502 is above a threshold level 512 of the firing circuit 504. The spike signal 508 may be gated by an output signal 514 of the random binary generator 506 to generate a post-synaptic gated spike signal 516 for all synapses 518 connected to the neuron 502. The neuron 502 may be also connected to other neurons (i.e., post-synaptic neurons of the neuron 502) via an axonal delay circuit 520.

In one embodiment of the present disclosure, if the neuron 502 represents a pre-synaptic neuron of a correct classification output neuron (i.e., the correct output neuron may be one of the neurons interfaced with the axonal delay circuit 520), then the encouragement of the correct classification output during the training of the neural processor may be achieved by increasing a probability of logical "1" at the output 514 of the random binary generator 506. By applying this, a potentiation probability of an input synapse of the correct output neuron circuit interfaced with the axonal delay circuit 520 may be increased.

In another embodiment of the present disclosure, if the neuron 502 represents the actual correct output neuron, then the encouragement of the correct output during the training may be achieved by lowering the probability of logical "1" at the output 514 of the random binary generator 506. By applying this, the depression probability of the input synapses 518 of the correct output neuron 502 may be lowered.

In yet another embodiment of the present disclosure, if the neuron 502 represents the correct classification output neuron, the encouragement of the correct output during the training may be achieved by decreasing the threshold level 512 of the firing circuit 504. Then, the probability of firing of the correct output neuron may be increased. It should be noted that the lowering of the depression probability of the synapses 518 may be also combined with the decreasing of the threshold level 512.

As illustrated in FIG. 5, each synapse 518 may receive a pre-synaptic spike 522, its delayed version 524 and the post-synaptic spike signal 516. A logic consisting of two AND gates 526-528 and an inverter 530 may detect a training event. The LTP training event may be detected when the delayed pre-synaptic spike signal 524 is equal to logic "1" and the post-synaptic signal 516 didn't yet spike (i.e., it may be still equal to logic "0"). On the other hand, the LTD training event may be detected when the post-synaptic spike signal 516 is equal to logic "1" and the delayed pre-synaptic spike signal 524 is also equal to logic "1."

According to this logic, no training may take place when there is no pre-synaptic spike (i.e., when the delayed pre-synaptic spike signal 524 is equal to logic "0"). If the training event is detected (either LTP or LTD), an output signal 538 of an OR gate 536 may be equal to logic "1." The signal 538 may be applied as a clock signal to an up-down counter 540 that stores a current weight value of the synapse 518. A state of the counter 540 may be incremented if the detected training event corresponds to the LTP (i.e., an output 534 of an SR latch 532 is equal to logic "1"). On the other hand, the counter state may be decremented if the detected training event corresponds to the LTD (i.e., the output 534 of the SR latch 532 is equal to logic "0").

The signal 538 that emulates the detected training event may be also utilized to trigger transferring of the counter state into a non-volatile memory (NVM) 542. The synaptic weight stored in the up-down counter 540 may be also used as an input to a binary-weighted DAC circuit 544. An output current 546 of the DAC 544 may be gated by the pre-synaptic spike signal 522 before being summed with output currents of other synapses 518 connected to the input 548 of the neuron 502.

Figure 6:
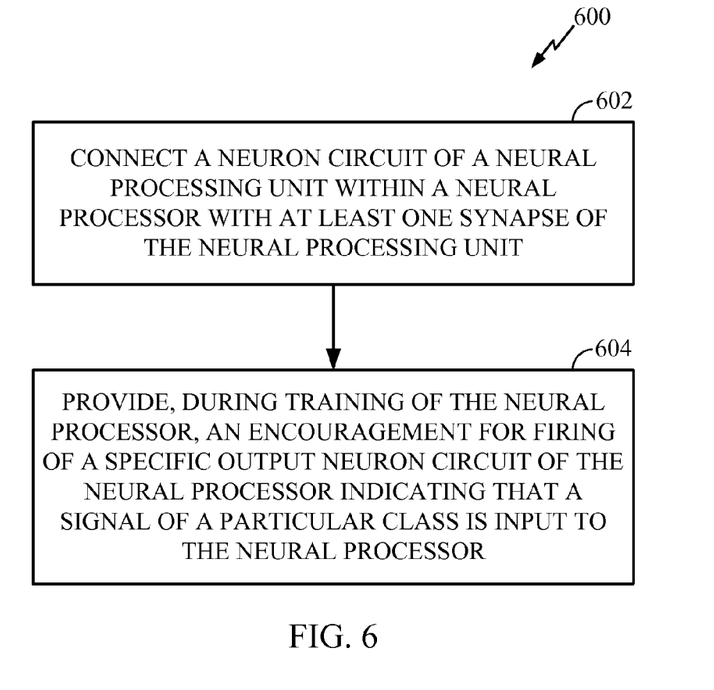
FIG. 6 illustrates example operations for implementing the neural processing unit with synapse weight training based on the encouragement of correct output in accordance with certain embodiments of the present disclosure.

FIG. 6 illustrates example operations 600 for implementing the neural processing unit from FIG. 5 within a neural processor in accordance with certain embodiments of the present disclosure. At 602, a neuron circuit (e.g., the neuron circuit 502 from FIG. 5) of the neural processing unit may be connected with one or more synapses (e.g., the synapses 518) of the neural processing unit. At 604, the neural processing unit may provide, during training of the neural processor, an encouragement for firing of a specific output neuron circuit of the neural processor indicating that a signal of a particular class (e.g., a known test image) may be input to the neural processor.

The proposed neural processing unit 500 from FIG. 5 may be incorporated into the network of spiking neurons 206 illustrated in FIG. 2, and it can be tested for image classifications. Simulation results show that the proposed implementation from FIG. 5 leads to correct classification of all tested images. The proposed method is also simpler to implement in hardware because it may not require eligibility trace generators within synapses, and it may utilize less interconnections.

Figure 6A:
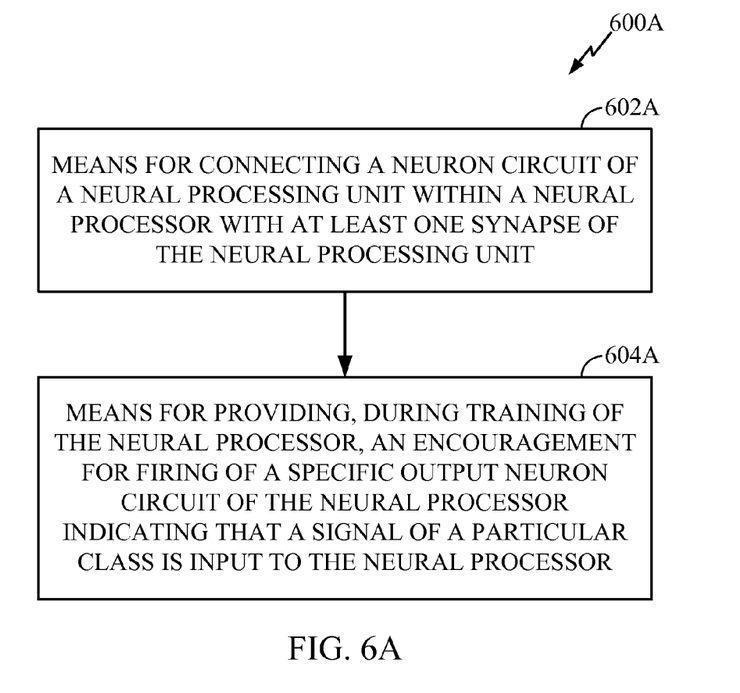
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. An electrical circuit, comprising:
a neural processing unit of a neural processor with one or more synapses and with a neuron circuit, comprising a generator circuit connected to the synapses to generate least one parameter comprises increasing or decreasing a probability of each pulse signal to occur in a defined time interval.

2. The electrical circuit of claim 1, wherein:
increasing the probability of the pulse to occur increases a probability of potentiation of the synapse connected with the output neuron circuit.

3. The electrical circuit of claim 2, wherein:
the neuron circuit comprises a firing circuit connected to the one or more synapses,
an output of the firing circuit is gated by the pulse signal to generate a gated spike signal, and
the potentiation of the synapse is based at least on the gated spike signal.

4. The electrical circuit of claim 1, wherein:
decreasing the probability of the pulse to occur decreases a probability of depression of the one or more synapses.

5. The electrical circuit of claim 4, wherein:
the neuron circuit comprises a firing circuit connected to the one or more synapses,
an output of the firing circuit is gated by the pulse signal to generate a gated spike signal, and
the depression of the one or more synapses is based at least on the gated spike signal.

6. The electrical circuit of claim 1, wherein the neural processing unit is a digital neural processing unit and each of the synapses comprises:
a digital-to-analog conversion circuit gated by a pre-synaptic spike signal generating an electrical current to be input into the neuron circuit, a value of the electrical current is based on a weight value of that synapse.

7. An electrical circuit, comprising:
a neural processing unit of a neural processor with one or more synapses and with a neuron circuit connected to the synapses,
wherein the neural processing unit provides, during training of the neural processor, an encouragement for firing of a specific output neuron circuit of the neural processor indicating that a signal of a particular class is input to the neural processor, wherein:
the neuron circuit as the output neuron circuit comprises a firing circuit connected to the one or more synapses, and
the encouragement during the training comprises increasing a probability of firing of the firing circuit.

8. The electrical circuit of claim 7, wherein the probability of firing is increased by lowering a threshold level of the firing circuit.

9. The electrical circuit of claim 7, wherein:
the probability of firing is increased by increasing a probability of potentiation of at least one of the synapses, and
the probability of potentiation is increased by generating a pulse signal at an output of a generator circuit within the neuron circuit.

10. The electrical circuit of claim 9, wherein:
an output of the firing circuit is gated by the pulse signal to generate a gated spike signal, and
the potentiation of the at least one synapse is based at least on the gated spike signal.

11. A method for implementing a neural processing unit of a particular class is input to the neural processor, wherein the encouragement comprises modifying at least one parameter that affects firing the specific output neuron circuit, wherein the modifying at least one parameter comprises increasing or decreasing a probability of each pulse signal to occur in a defined time interval.

12. The method of claim 11, wherein increasing the probability of the pulse to occur increases a probability of potentiation of the synapse connected with the output neuron circuit.

13. The method of claim 12, further comprising:
connecting a firing circuit of the neuron circuit to the one or more synapses; and
gating an output of the firing circuit by the pulse signal to generate a gated spike signal, wherein
the potentiation of the synapse is based at least on the gated spike signal.

14. The method of claim 11, wherein decreasing the decreased probability of the pulse to occur decreases a probability of depression of the one or more synapses.

15. The method of claim 14, further comprising:
connecting a firing circuit of the neuron circuit to the one or more synapses; and
gating an output of the firing circuit by the pulse signal to generate a gated spike signal, wherein
the depression of the one or more synapses is based at least on the gated spike signal.

16. The method of claim 11, wherein the neural processing unit is a digital neural processing unit and further comprising:
generating, within each of the synapses by a digital-to-analog conversion circuit gated by a pre-synaptic spike signal, an electrical current to be input into the neuron circuit, wherein a value of the electrical current is based on a weight value of that synapse.

17. A method for implementing a neural processing unit of a neural processor, comprising:
connecting a neuron circuit comprising a generator circuit of the neural processing unit with one or more synapses of the neural processing unit to generate a pulse signal;
providing, during training of the neural processor, an encouragement for firing of a specific output neuron circuit of the neural processor indicating that a signal of a particular class is input to the neural processor; and
connecting a firing circuit of the neuron circuit that represents the output neuron circuit to the one or more synapses, wherein
the encouragement during the training comprises increasing a probability of firing of the firing circuit.

18. The method of claim 17, wherein the probability of firing is increased by lowering a threshold level of the firing circuit.

19. The method of claim 17, wherein:
the probability of firing is increased by increasing a probability of potentiation of at least one of the synapses, and
the probability of potentiation is increased by generating a pulse signal at an output of a generator circuit within the neuron circuit.

20. The method of claim 19, further comprising:
gating an output of the firing circuit by the pulse signal to generate a gated spike signal, wherein
the potentiation of the at least one synapse is based at least on the gated spike signal.

21. An apparatus for implementing a neural processing unit of a neural processor, comprising:
means for connecting a neuron circuit, comprising a generator circuit, of the neural processing unit with one or more synapses of the neural processing unit to generate a pulse signal; and
means for providing, during training of the neural processor, an encouragement for firing of a specific output neuron circuit of the neural processor indicating that a signal of a particular class is input to the neural processor, wherein the encouragement comprises modifying at least one parameter that affects firing the specific output neuron circuit, wherein the modifying at least one parameter comprises increasing or decreasing a probability of each pulse signal to occur in a defined time interval.

22. The apparatus of claim 21, wherein increasing the probability of the pulse to occur increases a probability of potentiation of the synapse connected with the output neuron circuit.

23. The apparatus of claim 22, further comprising:
means for connecting a firing circuit of the neuron circuit to the one or more synapses; and
means for gating an output of the firing circuit by the pulse signal to generate a gated spike signal, wherein
the potentiation of the synapse is based at least on the gated spike signal.

24. The apparatus of claim 21, wherein decreasing the probability of the pulse to occur decreases a probability of depression of the one or more synapses.

25. The apparatus of claim 24, further comprising:
means for connecting a firing circuit of the neuron circuit to the one or more synapses; and
means for gating an output of the firing circuit by the pulse signal to generate a gated spike signal, wherein
the depression of the one or more synapses is based at least on the gated spike signal.

26. The apparatus of claim 21, wherein the neural processing unit is a digital neural processing unit and further comprising:
means for generating, within each of the synapses by a digital-to-analog conversion circuit gated by a pre-synaptic spike signal, an electrical current to be input into the neuron circuit, wherein a value of the electrical current is based on a weight value of that synapse.

27. An apparatus for implementing a neural processing unit of a neural processor, comprising:
means for connecting a neuron circuit of the neural processing unit with one or more synapses of the neural processing unit; and
means for providing, during training of the neural processor, an encouragement for firing of a specific output neuron circuit of the neural processor indicating that a signal of a particular class is input to the neural processor, further comprising:
means for connecting a firing circuit of the neuron circuit that represents the output neuron circuit to the one or more synapses, wherein
the encouragement during the training comprises increasing a probability of firing of the firing circuit.

28. The apparatus of claim 27, wherein the probability of firing is increased by lowering a threshold level of the firing circuit.

29. The apparatus of claim 27, wherein:
the probability of firing is increased by increasing a probability of potentiation of at least one of the synapses, and the probability of potentiation is increased by generating a pulse signal at an output of a generator circuit within the neuron circuit.

30. The apparatus of claim 29, further comprising:
means for gating an output of the firing circuit by the pulse signal to generate a gated spike signal, wherein
the potentiation of the at least one synapse is based at least on the gated spike signal.

31. A non-transitory computer-readable medium comprising code for:
interfacing a neural processing unit of a neural processor with a neuron circuit, comprising a generator circuit, with one or more synapses of the neural processing unit to generate a pulse signals; and
providing, during training of the neural processor, an encouragement for firing of a specific output neuron circuit of the neural processor indicating that a signal of a particular class is input to the neural processor, wherein the encouragement comprises modifying at least one parameter than affects firing the specific output neuron circuit, wherein the modifying at least one parameter comprises increasing or decreasing a probability of each pulse signal to occur in a defined time interval.

32. The non-transitory computer-readable medium of claim 31, wherein increasing the probability of the pulse to occur increases a probability of potentiation of the synapse connected with the output neuron circuit.

33. The non-transitory computer-readable medium of claim 32, further comprising code for:
interfacing a firing circuit of the neuron circuit to the one or more synapses; and
gating an output of the firing circuit by the pulse signal to generate a gated spike signal, wherein
the potentiation of the synapse is based at least on the gated spike signal.

34. The non-transitory computer-readable medium of claim 31, wherein decreasing the probability of the pulse to occur decreases a probability of depression of the one or more synapses.

35. The non-transitory computer-readable medium of claim 34, further comprising code for:
interfacing a firing circuit of the neuron circuit to the one or more synapses; and
gating an output of the firing circuit by the pulse signal to generate a gated spike signal, wherein
the depression of the one or more synapses is based at least on the gated spike signal.

36. The non-transitory computer-readable medium of claim 31, wherein the neural processing unit is a digital neural processing unit and further comprising code for:
generating, within each of the synapses by a digital-to-analog conversion circuit gated by a pre-synaptic spike signal, an electrical current to be input into the neuron circuit, wherein a value of the electrical current is based on a weight value of that synapse.

37. A non-transitory computer-readable medium comprising code for:
interfacing a neural processing unit of a neural processor with a neuron circuit with one or more synapses of the neural processing unit,
providing, during training of the neural processor, an encouragement for firing of a specific output neuron circuit of the neural processor indicating that a signal of a particular class is input to the neural processor,
interfacing a firing circuit of the neuron circuit that represents the output neuron circuit to the one or more synapses, wherein
the encouragement during the training comprises increasing a probability of firing of the firing circuit.

38. The non-transitory computer-readable medium of claim 37, wherein the probability of firing is increased by lowering a threshold level of the firing circuit.

39. The non-transitory computer-readable medium of claim 36, wherein:
the probability of firing is increased by increasing a probability of potentiation of at least one of the synapses, and
the probability of potentiation is increased by generating a pulse signal at an output of a generator circuit within the neuron circuit.

40. The non-transitory computer-readable medium of claim 39, further comprising code for:
gating an output of the firing circuit by the pulse signal to generate a gated spike signal, wherein
the potentiation of the at least one synapse is based at least on the gated spike signal.

\* \* \* \* \*